May 10, 1932.  A. F. KUESTER  1,857,784
TRAILER
Filed April 7, 1930
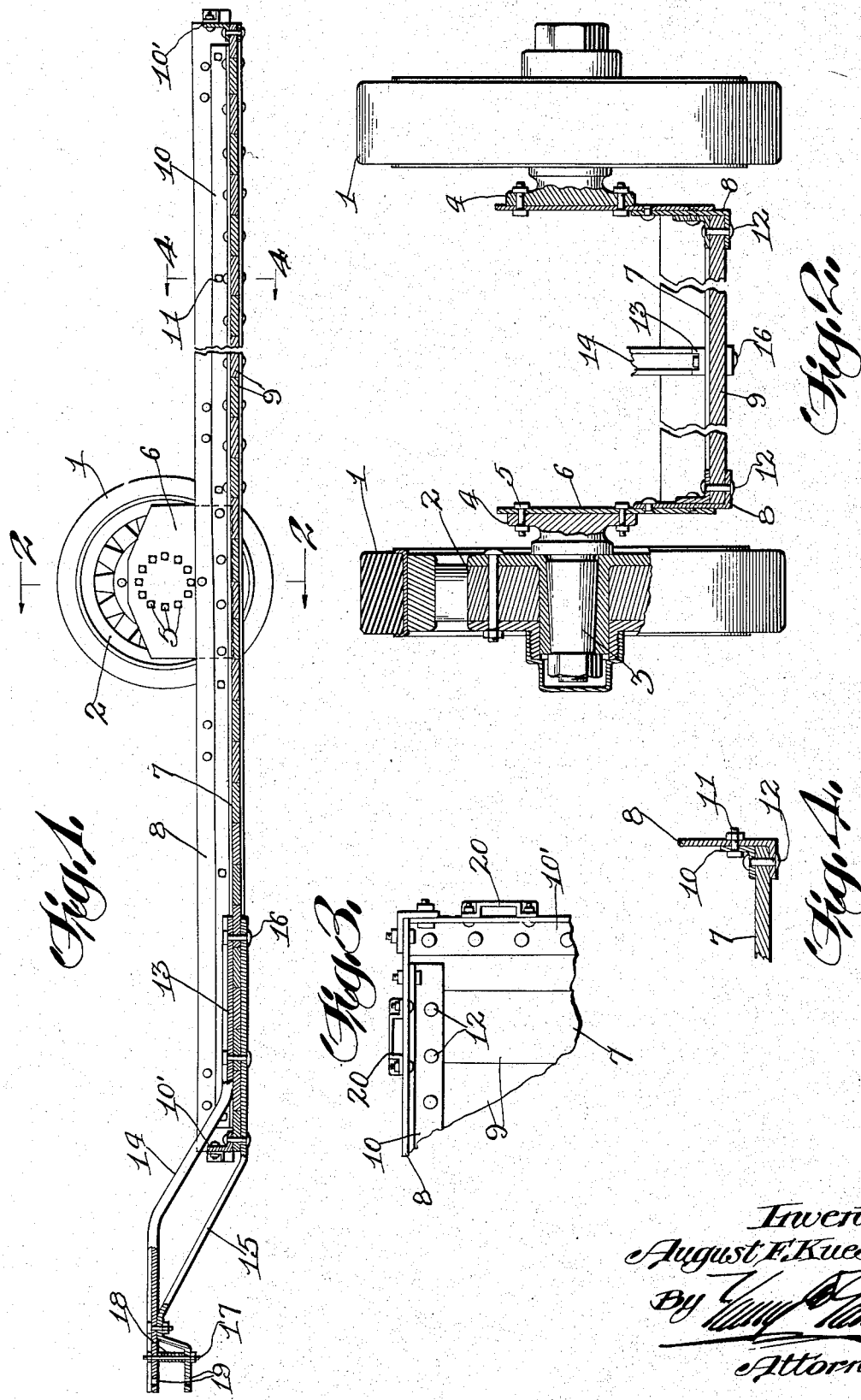
Inventor
August F. Kuester Patented May 10, 1932

1,857,784

UNITED STATES PATENT OFFICE

AUGUST F. KUESTER, OF CLINTONVILLE, WISCONSIN

TRAILER

Application filed April 7, 1930. Serial No. 442,167.

This invention relates to improvements in trailers and more particularly to that type known as the underslung or low bed type of trailer.

One of the objects of my invention is the provision of a trailer wherein the bed is suspended from the axles to a point just above the traction surface, whereby should the supporting wheels for the trailer sink into a soft surface, the trailer can be readily dragged along on its lower face without interfering with the traction of the device.

Another object of my invention is the provision of novel means for suspending the trailer platform from the axles of the traction wheels whereby the bed of the trailer is supported just above the traction surface so that due to any heavy loads, should the traction wheels sink below the normal traction surface, the trailer can be easily dragged along on the surface so as not to interfere with the progress of the trailer.

A further object of the invention is the provision of what is known as underslung or low bed trailer which can be attached to axles of traction wheels and provided with means at one end for connecting the trailer to motive power, such as a tractor or the like, whereby to convey comparatively heavy loads over a traction surface, and the device is of such construction that it can be manufactured and placed on the market at a very low cost.

With the above and other objects in view, the invention consists in the novel features of construction, the combination and arrangement of parts hereinafter more fully set forth, pointed out in the claims and shown in the accompanying drawings wherein:

Figure 1 is a longitudinal sectional view taken through my improved trailer;

Figure 2 is a transverse section on the line 2—2 of Figure 1, with one of the traction wheels in elevation;

Figure 3 is a top plan view; and,

Figure 4 is a detail section on the line 4—4 of Figure 1.

Referring more particularly to the drawings, 1 indicates the treads of a well known type of traction wheels 2, mounted upon the stub axles 3. Each axle is provided at its inner end with a disc-like head portion 4 providing an annular flange around the inner end of the axle.

The flange or head 4 is provided with a plurality of openings for bolts 5 which are passed through a substantial rectangular suspension plate 6 which is engaged with each head or flange 4, as shown in the drawings. The lower edge of this plate extends downwardly below the head 4 to any predetermined distance and between the plates 6 is a platform or bed 7.

In the construction of the platform or bed 7, two substantially heavy angular plates 8 are used for each side of the bed with their horizontal portions extending toward each other and adapted to receive thereon the ends of the cross pieces 9 which are arranged transversely of the bed with their edges in intimate contact, as shown in Figure 1, so as to provide a substantially even surface for the upper face of the bed. The vertical portions of the angular plates 8 are secured to the lower extended portions of the plate 6, as shown in Figures 1 and 2, for supporting the platform or bed a predetermined distance below the axles 3 in order to reinforce the bed and to securely maintain the cross pieces 9 in proper position, angle bars 10 are arranged upon the tops of the cross pieces 9 and are secured in position by having their vertical flanges bolted to the vertical flanges of the angular plates 8 by means of suitable bolts 11, while the horizontal portions thereof are secured in position by means of the headed bolts 12 which connect the cross pieces to the horizontal portions of the angular plates 8. At the front of the bed or platform, there is attached to the upper face thereof a channel bar 13 which has its forward end arranged in a plane above a portion of the bar which is attached to the platform by means of the inclined part 14. The channel bar 13 is reinforced and given an added strength through the medium of a brace bar 15, the inner end of which extends onto the lower face of the platform or bed 7 and is secured thereto by means of bolts 16 which hold the channel bar 13 in place. The outer ends of bars 14 and 15 are arranged in spaced relation, as shown in Figure 1, and carry a bolt 17 which has a spacing sleeve 18 thereon, and the extremities of bars 14 and 15 are provided with aligned openings to receive a clevis bolt.

It will be noted that both the front and rear ends of the bed or platform are provided with angle irons 10' to not only reinforce the end portions but to provide an upstanding stop plate to prevent articles from sliding off of the platform should the same assume an inclined position. The angular plates 8 and 10' also may have attached to the outer face thereof, the sockets 20 which are used for supporting side stakes upon the trailer.

It will be apparent from the foregoing that a low bed trailer constructed in accordance with my invention will not only prove extremely useful for conveying heavy loads over a smooth, hard surface, but will prove very practical when it is necessary to convey heavy loads over a comparatively soft traction surface where the wheels have a tendency to sink below the surface as the bed or platform will then ride upon the upper surface and can be dragged along on its lower face. It will also be noted that by having the bed or platform swung below the supporting axles, heavy articles such as safes and the like, can be easily loaded onto the trailer and unloaded. It will also be noted that the plates 6 can be readily attached to or detached from the axle flange or head 4, and plates of different widths can be used for suspending the platform at different heights with respect to the traction axles, and the securing bolts which attach the vertical portion of angular plates 8 to the suspension plate 6 can be altered with regard to their position if the case requires, so that the relative position of the bed or platform can be changed with respect to the axles 3.

One of the important features of my invention is the formation of the platform, and the fact that the lower faces of the horizontal portions or flanges of the angular side plates 8 not only form means for uniting the body boards or cross pieces 9, but also form runners for engaging soft surfaces should the wheels sink in the soft surfaces.

It is believed that a trailer constructed in accordance with my invention will prove extremely useful in transporting safes and other heavy objects, and due to the simplicity of construction of the device, it can be manufactured and placed on the market at a very low cost. Attention is also directed to the fact that while only two traction wheels are described and illustrated as supporting the bed or platform, any number of supporting wheels can be used and the length of the platform extended, if found desirable.

It will be noted that the angle bars 10 extend longitudinally the full length of the trailer and cooperate with the angle plates 8 to properly reinforce the longitudinal edges of the platform 7. The horizontal portions of the angle plates 10 which extend onto the upper face of the platform also provide suitable engaging means for the heads of the bolts 12, whereby these bolts will not have a tendency to pull through the platform under heavy load.

With regard to the connection between the plate 6 and the axles 3, attention is directed to the fact that while I have shown and described the inner ends of the axles as provided with an annular flange, it will be apparent that various other ways may be provided for supporting plate 6 upon the inner ends of the axles, so that the plates may be readily connected or disconnected to the axles.

While I have shown and described the preferred embodiment of my invention, it will be apparent that slight changes may be made in the construction when putting the invention into practice without departing from the spirit of the same or the scope of the appended claims.

I claim:

1. A trailer including spaced traction wheels, axles carried thereby and having head portions at the inner ends, a platform, angular plates embracing the longitudinal edges of the platform, and means for detachably connecting said angular plates with the heads on the axles for supporting the platform below said axles.

2. A trailer including spaced traction wheels, axles carried thereby and having head portions at the inner ends thereof, supporting plates attached to the heads of the axles, and extending below said axles, angular plates having their vertical portions attached to the supporting plates and a platform supported by the horizontal portions of said angular plates whereby the platform is supported below the axles and just above the traction surface of the wheels.

3. A trailer including traction wheels, axles carried thereby each having a circular head plate at its inner end, a platform including parallel contacting cross pieces, angular plates at the ends of the cross pieces with the horizontal portions thereof disposed beneath the cross pieces and secured thereto, means forming removable connection between the head pieces on the axles and the vertical portion on the angular plates, whereby to support said platform beneath the axles and at different heights relative to the treads of the traction wheels, and attaching means at one end of said platform for connecting the same to a source of pulling power.

4. A trailer of the class described including spaced traction wheels, stub axles carried by said wheels, circular head pieces on the inner ends of said stub axles, supporting plates removably connected to said head pieces and depending below the axles, angular plates having their vertical portions connected to the supporting plates with their horizontal portions extending toward each other, a platform mounted upon the horizontal portions of said angular plates, and means at one end of said platform whereby to connect the platform to a source of pulling power.

5. A trailer of the class described including spaced traction wheels, stub axles carried by said wheels, flanged heads on the inner ends of said axles, supporting plates removably attached to the heads and extending below the same, a platform, angular plates having their horizontal portions positioned beneath the bottom of the platform and secured thereto, and the vertical portions of said angular plates extending upwardly and attached to the depending portions of the supporting plates.

6. A trailer for use on soft surfaces comprising a body including longitudinally extending vertical side plates having inwardly directed horizontally disposed supporting flanges, body boards bridging the side plates and resting on the top faces of the flanges, angle bars secured to the inner faces of the side plates above the body boards, means uniting the angle bars, body boards, and flanges together, upwardly extending plates connected with the side plates, and vehicle supporting wheels associated with said last mentioned plates, the lower faces of the supporting flanges of the side plates forming runners for engaging the ground, should the wheels sink in the soft surface.

In testimony that I claim the foregoing I have hereunto set my hand at Milwaukee, in the county of Milwaukee and State of Wisconsin.

AUGUST F. KUESTER.